United States Patent
Lu et al.

(10) Patent No.: US 8,877,543 B2
(45) Date of Patent: Nov. 4, 2014

(54) METHOD FOR FABRICATING DYE-SENSITIZED SOLAR CELL

(75) Inventors: Ming-De Lu, Miaoli County (TW); Yung-Liang Tung, Hualien County (TW); Kai-Ping Wang, Tainan (TW); Hsisheng Teng, Tainan (TW); Po-Tsung Hsiao, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 247 days.

(21) Appl. No.: 13/584,706

(22) Filed: Aug. 13, 2012

(65) Prior Publication Data

US 2012/0315723 A1 Dec. 13, 2012

Related U.S. Application Data

(62) Division of application No. 12/858,324, filed on Aug. 17, 2010, now abandoned.

(30) Foreign Application Priority Data

Dec. 7, 2009 (TW) .............................. 98141672 A

(51) Int. Cl.
 *H01L 31/18* (2006.01)
 *H01G 9/20* (2006.01)
(52) U.S. Cl.
 CPC ............. *H01G 9/2036* (2013.01); *Y02E 10/542* (2013.01)
 USPC ..................................... 438/98; 257/E31.032
(58) Field of Classification Search
 None
 See application file for complete search history.

(56) References Cited

U.S. PATENT DOCUMENTS

| | | | |
|---|---|---|---|
| 5,482,570 A | 1/1996 | Saurer et al. | |
| 5,525,440 A | 6/1996 | Kay et al. | |
| 5,840,111 A | 11/1998 | Wiederhoft et al. | |
| 6,270,571 B1 | 8/2001 | Iwasaki et al. | |
| 6,355,821 B1 | 3/2002 | Koplick et al. | |
| 6,596,078 B2 | 7/2003 | Konakahara et al. | |

(Continued)

FOREIGN PATENT DOCUMENTS

TW 200919742 5/2009

OTHER PUBLICATIONS

Kai-Ping Wang et al., "Zinc-doping in $TiO_2$ Films to Enhance Electron Transport in Dye-Sensitized Solar Cells under Low-Intensity Illumination," Physical Chemistry Chemical Physics, Aug. 2009, pp. 9489-9496, The Owner Societies, US.

(Continued)

*Primary Examiner* — Seahvosh Nikmanesh

(57) ABSTRACT

A method for fabricating a dye-sensitized solar cell is provided. The dye-sensitized solar cell includes a photo electrode including (a) mixing a $TiO_2$ powder, a Zn-containing compound and an alkaline aqueous solution to form a mixture and performing a thermal process on the mixture to form a Zn-doped $TiO_2$ powder; (b) mixing a binder solution with the Zn-doped $TiO_2$ powder to form a paste; (c) coating the paste on a first electrode, and the paste is sintered to form a Zn-doped $TiO_2$ porous layer, wherein the Zn-doped $TiO_2$ porous layer and the first electrode construct a photo electrode; (d) disposing a second electrode opposite to the photo electrode after a dye is absorbed by the Zn-doped $TiO_2$ porous layer; and (e) disposing an electrolyte between the photo electrode and the second electrode.

13 Claims, 5 Drawing Sheets

(56) References Cited

U.S. PATENT DOCUMENTS

| | | |
|---|---|---|
| 6,649,824 B1 | 11/2003 | Den et al. |
| 6,743,749 B2 | 6/2004 | Morikawa et al. |
| 6,860,982 B2 | 3/2005 | Okura et al. |
| 6,992,042 B2 | 1/2006 | Hemme et al. |
| 7,087,831 B2 | 8/2006 | Den et al. |
| 7,420,117 B2 | 9/2008 | Koyanagi et al. |
| 2008/0210296 A1* | 9/2008 | Morooka et al. ............. 136/252 |

OTHER PUBLICATIONS

Taiwan Patent Office, Office Action, Patent Applicaiton Serial No. 098141672, Apr. 24, 2014, Taiwan.

Yury V. Kolen'ko et al., "Structural. Textural and Electronic Properties of a Nanosized Mesoporous $Zn_xTi_{1-x}O_{2-x}$ Solid Solution Prepared by a Supercritical Drying Route", J. Phys. Chem. B 2005, 109, Oct. 11, 2005, p. 20303-20309, American Chemical Society, US.

Liqiang Jing et al., "Effects of Surface Oxygen Vacancies on Photophysical and Photochemical Processes of Zn-Doped $TiO_2$ Nanoparticles and Their Relationships", J. Phys. Chem. B 2006, 110. Aug. 23, 2006, p. 17860-17865, American Chemical Society, US.

Jun-Ho Yum et al., "Improved Performance in Dye-Sensitized Solar Cells Employing $TiO_2$ Photoelectrodes Coated with Metal Hydroxides", J. Phys. Chem. B 2006, p. 3215-3219, American Chemical Society, US.

Y. Wang, Y. Hao, H. Chang, J. Ma, B. Xu, W. Li, S. Cai. "The Photoelectrochemistry of transition metal-ion-doped TiO2 nanocrystalline electrodes and gigher solar cell conversion efficiency based on Zn2+ -doped TiO2 electrode", Journal of Materials Science, 34, 1999, p. 2773-2779.

Kai-Ping Wang et al., "Structure Design for the TiO2 Films of Dye-Sensitized Solar Cells to Improve Electron Transport," Jul. 2009, 2 pages, National Cheng Kung University Department of Chemical Engineering, Taiwan.

Taiwan Patent Office, Office Action, Patent Application Serial No. 98141672, Aug. 14, 2013, Taiwan.

\* cited by examiner

METHOD FOR FABRICATING DYE-SENSITIZED SOLAR CELL

CROSS REFERENCE TO RELATED APPLICATIONS

This application is a division of U.S. patent application Ser. No. 12/858,324, filed on Aug. 17, 2010, which claims priority of Taiwan Patent Application No. 098141672, filed on Dec. 7, 2009, the entirety of which are incorporated by reference herein.

BACKGROUND

1. Field of the Disclosure

The present disclosure relates to a method for fabricating a dye-sensitized solar cell.

2. Description of the Related Art

Solar energy is a promising alternative energy source. Developments in solar energy technology are driven by the fact that solar energy is continuous and sustainable. Also, solar energy is environmentally friendly.

Generation of solar energy requires solar cells. Simplistically, electricity is generated by circuitry, generated by illumination of a material to generate electrons and holes. For example, a dye-sensitized solar cell (DSSC) is formed by sintering a semiconductor type metal oxide such as $TiO_2$ on a conductive substrate. A dye is then absorbed by a surface of the semiconductor type metal oxide to form a photo-anode. An electrolyte between the photo-anode and a cathode aids in electrical conduction. Currently, technological development of DSSCs is popular due to its high photo-induced electron transfer efficiency and low costs. However, for a DSSC applied in a portable power supply, electron loss resulting in decreased photo-induced electron transfer efficiency is a problem when the DSSC is under a low light intensity environment.

Meanwhile, conventionally used semiconductor photo-catalytic materials, may comprise $TiO_2$, $ZnO$, $SnO_2$ or $CdS$. Of the materials, $TiO_2$ is a popular material due to its high oxidation-reduction ability, high chemical stability and the fact that it is non-poisonous. The conventional metal ion-doped photocatalytic materials are mainly applied to improve photocatalytic activity by trapping oxides to increase the absorption of light.

Thus, a novel dye-sensitized solar cell and a method for fabricating the same are desired with minimum electron loss under a low light intensity environment, resulting in increased photo-induced electron transfer efficiency.

BRIEF SUMMARY

A method for fabricating a dye-sensitized solar cell is provided. An exemplary embodiment of a method for fabricating a dye-sensitized solar cell comprises: (a) mixing a $TiO_2$ powder, a Zn-containing compound and an alkaline aqueous solution to form a mixture and performing a thermal process on the mixture to form a Zn-doped $TiO_2$ powder; (b) mixing a binder solution with the Zn-doped $TiO_2$ powder to form a paste; (c) coating the paste on a first electrode, and the paste is sintered to form a Zn-doped $TiO_2$ porous layer, wherein the Zn-doped $TiO_2$ porous layer and the first electrode construct a photo electrode; (d) disposing a second electrode opposite to the photo electrode after a dye is absorbed by the Zn-doped $TiO_2$ porous layer; and (e) disposing an electrolyte between the photo electrode and the second electrode.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein.

DETAILED DESCRIPTION

Figure 1:
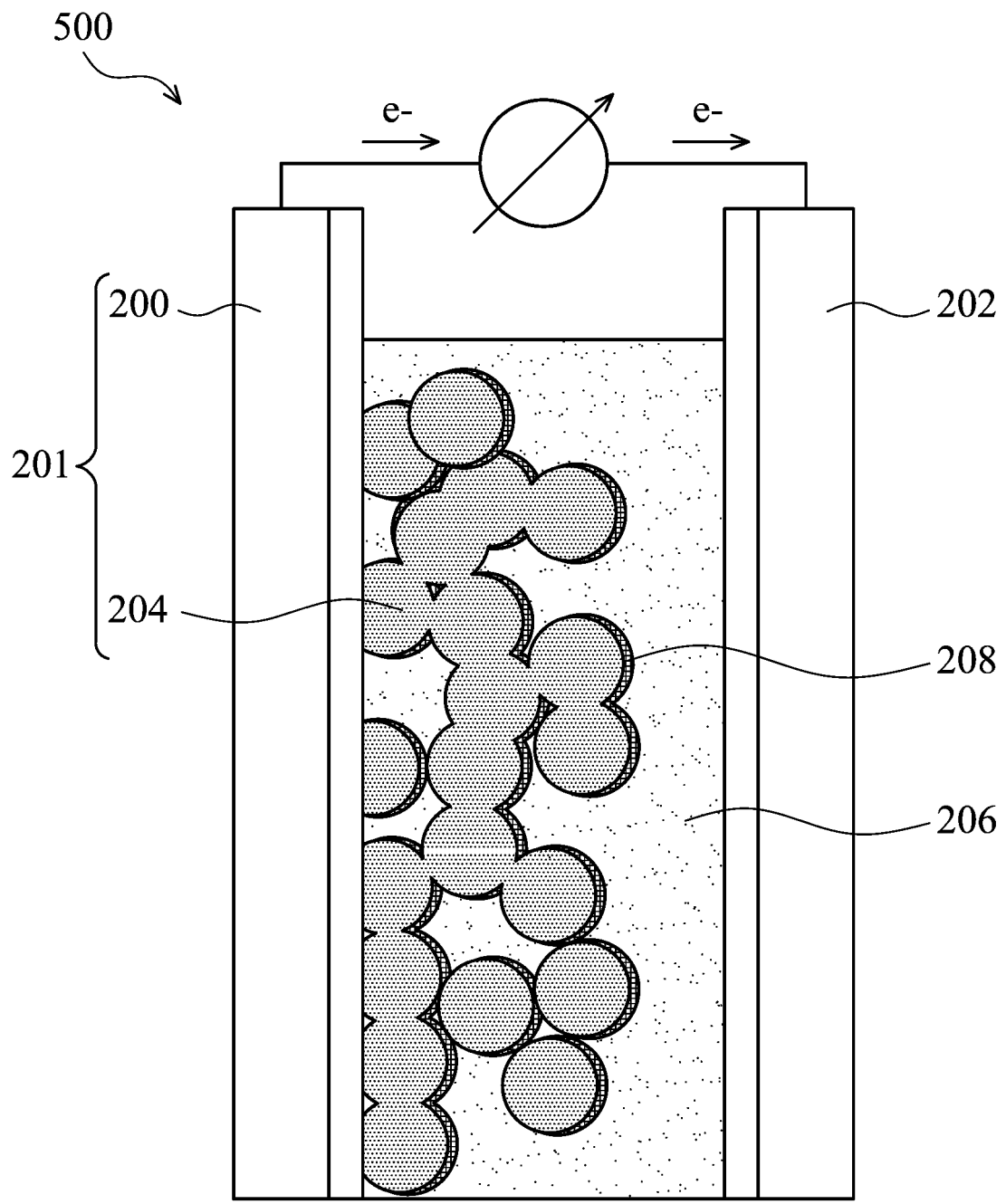
FIG. 1 is a schematic diagram showing one exemplary embodiment of a dye-sensitized solar cell.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One exemplary embodiment provides a dye-sensitized solar cell, wherein a photo electrode of the dye-sensitized solar cell comprises a Zn-doped $TiO_2$ porous layer having a continuous electron transport path, thereby minimizing electron loss and increasing photoelectric conversion efficiency; especially in low light intensity environments.

FIG. 1 is a schematic diagram showing one exemplary embodiment of a dye-sensitized solar cell (DSSC) 500. The DSSC 500 may comprise a photo electrode 201 and an opposing second electrode 202, wherein the photo electrode 201 comprises a first electrode 200 and a Zn-doped $TiO_2$ porous layer 204 disposed on the first electrode 200. In one embodiment, the first electrode 200 may comprise a transparent electrode, for example, a fluorine tin oxide (FTO) glass or an indium tin oxide (ITO) conductive glass, to enable outside light to transmit through the first electrode 200 into the DSSC 500. The second electrode 202 may serve as a counter electrode used to transmit the electrons from the peripheral circuit into the DSSC, thereby forming a current circuit. The second electrode 202 may comprise Pt, conductive polymer, carbon or composite materials. A Zn-doped $TiO_2$ porous layer 204 absorbing a dye 208 is disposed between the first and second electrodes 200 and 202. In one embodiment, the dye 208 may comprise organic dyes or inorganic dyes. An electrolyte 206 is disposed between the photo electrode 201 and the second electrode 202. In one embodiment, the electrolyte 206 may comprise liquid or solid electrolytes.

When operating one exemplary embodiment of the DSSC 500, the outside light is transmitted through the first electrode 200 into the Zn-doped $TiO_2$ porous layer 204 of the DSSC 500, and the Zn-doped $TiO_2$ porous layer 204 converts light energy from the light into electrical energy.

In one embodiment, a method for fabricating the DSSC 500 may comprise disposing the Zn-doped $TiO_2$ porous layer 204 between the first electrode 200 and the opposing second electrode 202. Next, an electrolyte 206 is disposed between the photo electrode 201 and the second electrode 202 using an injection or coating process. A method for fabricating the Zn-doped $TiO_2$ porous layer 204 may comprise steps as below.

Step (a): A $TiO_2$ powder, a Zn-containing compound and an alkaline aqueous solution are disposed in an autoclave and mixed to form a mixture. In one embodiment, the $TiO_2$ powder may comprise a commercial $TiO_2$ photocatalytic (Degussa P25). The Zn-containing compound may comprise Zn-containing inorganic metal salts or organic Zn-containing compounds, for example, $Zn(NO_3)_2 \cdot 6H_2O$ or $Zn(CH_3COO)_2 \cdot xH_2O$.

The alkaline aqueous solution may comprise a sodium hydroxide an aqueous solution (NaOH), wherein the alkaline aqueous solution has a normality of between about 5 to 15N, preferably about 10N.

Step (b): Performing a first thermal process on the mixture. In one embodiment, the first thermal process may comprise a hydrothermal synthesis process, wherein the first thermal process may have a process time of between about 20 and 40 hours, preferably about 20 hours. The first thermal process may have a process temperature of between about 110° C. and 140° C., preferably about 130° C. After performing the first thermal process, a flaky mixture is formed.

Step (c): A washing process is performed on the mixture using an acidic aqueous solution to neutralize the alkaline aqueous solution until the pH value of the mixture reaches about 1.5 to 4. During this time, a Zn-doped $TiO_2$ multiple layer nano tube is formed. In one embodiment, the acidic aqueous solution may comprise an aqueous solution of nitric acid ($HNO_3$) or hydrogen chloride (HCl), wherein the acidic aqueous solution has a normality of between about 0.02 and 0.2N, preferably about 0.1N.

Step (d): A second thermal process is performed on the mixture to recrystallize the mixture, thereby more Zn atoms are doped in the $TiO_2$. After performing the second thermal process, Zn-doped $TiO_2$ powder is formed. In one embodiment, the second thermal process may comprise a hydrothermal synthesis process, wherein the first thermal process may have a process time of between about 10 and 20 hours, preferably about 12 hours. The second thermal process may have a process temperature, which is higher than the first thermal process, of between about 180° C. and 250° C., preferably about 240° C.

Step (e): A binder solution is mixed with the Zn-doped $TiO_2$ powder to form a paste. In one embodiment, a solvent of the binder solution may comprise $H_2O$, an alcohol of $C_{1-4}$, terpineol or carbitol. The binder of the binder solution may comprise sodium carboxymethyl cellulose, carboxymethyl cellulose (CMC), polyethylene glycol (PEG), ethyl cellulose (EC) or arcylic resin. In an embodiment of the binder solution formed by the $H_2O$ solvent and the PEG binder, the Zn-doped $TiO_2$ powder may have a weight percentage of between about 30 wt % and 50 wt %, preferably about 40 wt %.

Step (f): The paste is coated on a first electrode 200 using a blade coating or screen printing process and then the paste is performed a sintering process to form a Zn-doped $TiO_2$ porous layer 204, wherein the Zn-doped $TiO_2$ porous layer 204 and the first electrode 200 construct a photo electrode 201.

Step (g): A second electrode 202 is disposed opposite to the photo electrode 201, so that the Zn-doped $TiO_2$ porous layer 204 is disposed between the first and second electrodes 200 and 202 with absorbing a dye.

Figure 2:
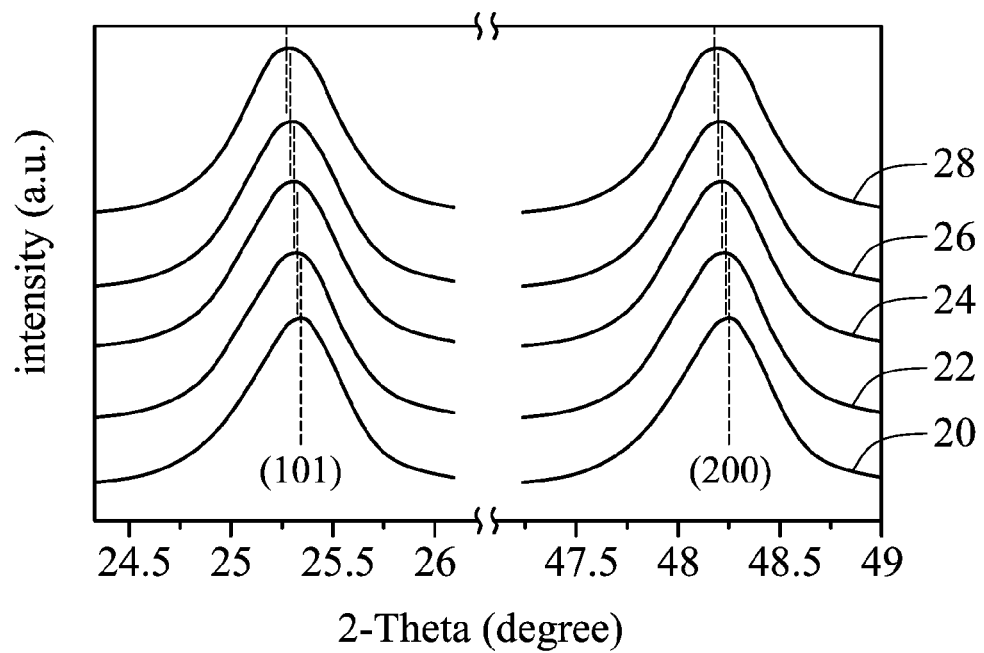
FIG. 2 is an x-ray diffraction diagram showing various exemplary embodiments of a photo electrode formed by a Zn-doped $TiO_2$ porous layer.

FIG. 2 is an x-ray diffraction diagram showing the conventional photo electrode formed by undoped $TiO_2$ and various exemplary embodiments of a photo electrode formed by a Zn-doped $TiO_2$ porous layer. Compared with a peak position of the conventional photo electrode formed by undoped $TiO_2$ photo-anode x-ray diffraction curve 20, peak positions of the exemplary embodiments including: a x-ray diffraction curve 22 of a photo electrode formed by a 0.2 at % (atom percent) Zn-doped $TiO_2$ porous layer (described as TZ02 hereinafter); a x-ray diffraction curve 24 of a photo electrode formed by a 0.4 at % Zn-doped $TiO_2$ porous layer (described as TZ04 hereinafter); a x-ray diffraction curve 26 of a photo electrode formed by a 0.7 at % Zn-doped $TiO_2$ porous layer (described as TZ07 hereinafter); and x-ray diffraction curve 28 of a photo electrode formed by a 1.2 at % Zn-doped $TiO_2$ porous layer (described as TZ12 hereinafter), all move toward a low diffraction angle. It is to be understood that in one exemplary embodiment of a photo electrode formed by a Zn-doped $TiO_2$ porous layer, a Zn atom having a large diameter ($Zn^{2+}$: 0.74 Å, $Ti^{4+}$: 0.6 Å) may be introduced into the $TiO_2$ crystal lattice, thereby expanding the $TiO_2$ crystal lattice. From FIG. 2, one exemplary embodiment of a photo electrode formed by a Zn-doped $TiO_2$ porous layer is represented by $Ti_{(1-x)}Zn_xO_2$.

Additionally, Zn-doped $TiO_2$ may be used in photocatalytic materials. In the fabrication process, Zn ion can be oxidized to form ZnO or be introduced into the $TiO_2$ crystal lattice, thereby changing the material composition of $TiO_2$. Therefore, Zn-doped $TiO_2$ photocatalytic performance under visible light may be changed. Zn-doped $TiO_2$ used in photocatalytic materials, however, has a purpose that is different from one exemplary embodiment of a photo electrode formed by a Zn-doped $TiO_2$ porous layer. The Zn-doped $TiO_2$ photocatalytic materials may be used to provide oxide traps, thereby increasing absorption of light to improve photocatalytic activity. One exemplary embodiment of a Zn-doped $TiO_2$ photo-anode is used to provide an electron transport path with rapid transport velocity. Meanwhile, the fabricating method of one exemplary embodiment of a Zn-doped $TiO_2$ photo-anode is different from the Zn-doped $TiO_2$ photocatalytic.

Figure 3:
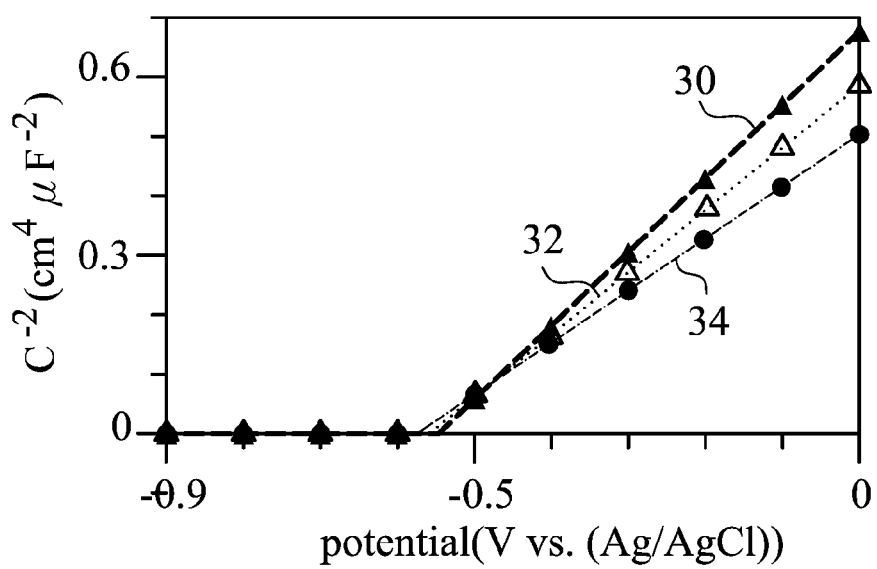
FIG. 3 is a Mott-Schottky plot showing one exemplary embodiment of a photo electrode formed by a Zn-doped $TiO_2$ porous layer.
Figure 4A:
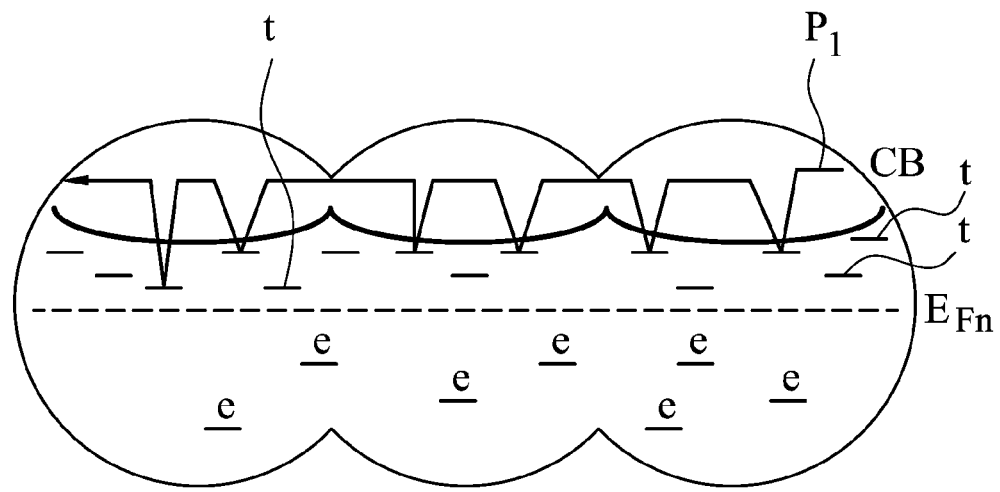
FIGS. 4a to 4b are energy band diagrams showing the conventional photo electrode formed by undoped $TiO_2$ and the one exemplary embodiment of photo electrode formed by a Zn-doped $TiO_2$ porous layer.
Figure 4B:
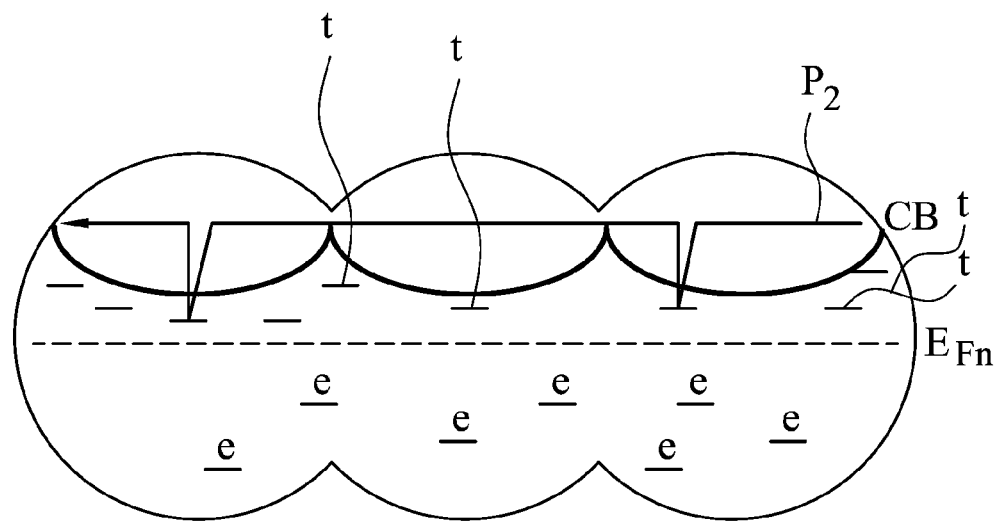

FIG. 3 is a Mott-Schottky plot showing one exemplary embodiment of a photo electrode formed by a Zn-doped $TiO_2$ porous layer, wherein Ag/AgCl is used as a reference electrode. FIGS. 4a to 4b are energy band diagrams showing the conventional photo electrode formed by undoped $TiO_2$ and one exemplary embodiment of a photo electrode formed by a Zn-doped $TiO_2$ porous layer. Table. 1 shows flat band voltage calculated from the intercept of FIG. 3 and donor density results calculated from FIG. 3.

TABLE 1

Flat band voltage and donor density comparisons between the conventional photo electrode formed by undoped $TiO_2$ and various exemplary embodiments of photo electrode formed by a Zn-doped $TiO_2$ porous layer.

|  | $TiO_2$ | TZ02 | TZ04 | TZ07 | TZ12 |
| --- | --- | --- | --- | --- | --- |
| flat band voltage ($E_F$ (V vs Ag/AgCl)) | −0.556 | −0.568 | −0.583 | −0.640 | −0.677 |

TABLE 1-continued

Flat band voltage and donor density comparisons between the conventional photo electrode formed by undoped $TiO_2$ and various exemplary embodiments of photo electrode formed by a Zn-doped $TiO_2$ porous layer.

| | $TiO_2$ | TZ02 | TZ04 | TZ07 | TZ12 |
|---|---|---|---|---|---|
| donor density (donor density ($cm^{-3}$)) | $3.4 \times 10^{19}$ | $3.9 \times 10^{19}$ | $4.8 \times 10^{19}$ | $4.6 \times 10^{19}$ | $4.5 \times 10^{19}$ |

From FIG. 3 and Table 1, compared with the conventional photo electrode formed by undoped $TiO_2$ photo-anode (labeled as curve 30), one exemplary embodiment of the a photo electrode formed by TZ02 (labeled as curve 32), a photo electrode formed by the TZ04 (labeled as curve 34), a photo electrode formed by the TZ07 and a photo electrode formed by the TZ12 have higher flat band voltage and donor density. As shown in FIG. 4a, the conventional photo electrode formed by undoped $TiO_2$ has a large number of unoccupied state traps. When the electrons are transported in the conventional photo electrode formed by undoped $TiO_2$, the electrons are easily captured by the unoccupied state traps, thereby generating electron loss. The electron transport path $P_1$ of the conventional photo electrode formed by undoped $TiO_2$ is not continuous. FIG. 4b shows that one exemplary embodiment of a photo electrode formed by the Zn-doped $TiO_2$ porous layer has high Fermi energy $E_{Fn}$, thereby causing a more curved energy band CB curve. The number of unoccupied state traps is thus reduced when compared to the conventional photo electrode formed by undoped $TiO_2$. Therefore, one exemplary embodiment of a photo electrode formed by the Zn-doped $TiO_2$ porous layer can provide a more continuous electron transport path $P_2$. Therefore, electron transportation efficiency is increased, so that the dye-sensitized solar cell still has high photoelectric conversion efficiency; especially in low light intensity environments.

Figure 5:
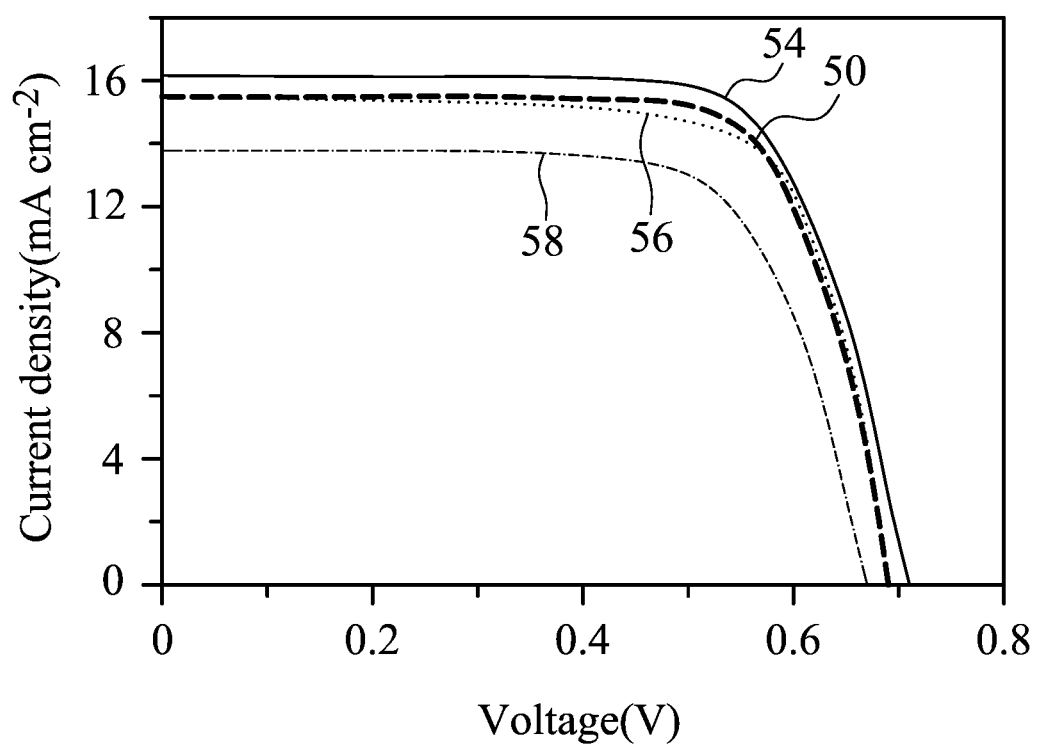
FIG. 5 is a current density-voltage (J-V) curve comparison between the conventional photo electrode formed by undoped $TiO_2$ and various exemplary embodiments of photo electrode formed by a Zn-doped $TiO_2$ porous layer.

FIG. 5 is a current density-voltage (J-V) curve comparison between the conventional photo electrode formed by undoped $TiO_2$ (thickness: 15 µm) and various exemplary embodiments of a photo electrode formed by a Zn-doped $TiO_2$ porous layer (thickness: 15 µm). The current density versus voltage result is measured under a simulated sun light source (100 mW*$cm^{-2}$) with a bias voltage. From FIG. 5, it is shown that the current density results of the photo electrode formed by the TZ04 (labeled as curve 54), the photo electrode formed by the TZ07 (labeled as curve 56) and the photo electrode formed by the TZ12 (labeled as curve 58) are of between about 14 mA*$cm^{-2}$ and 16 mA*$cm^{-2}$. The photo electrode formed by the TZ04 especially has the best current density result (16.2 mA*$cm^{-2}$), while the photo electrode formed by the TZ07 has the next best current density result, which is almost the same with the conventional photo electrode formed by undoped $TiO_2$ (15.5 mA*$cm^{-2}$).

Figure 6A:
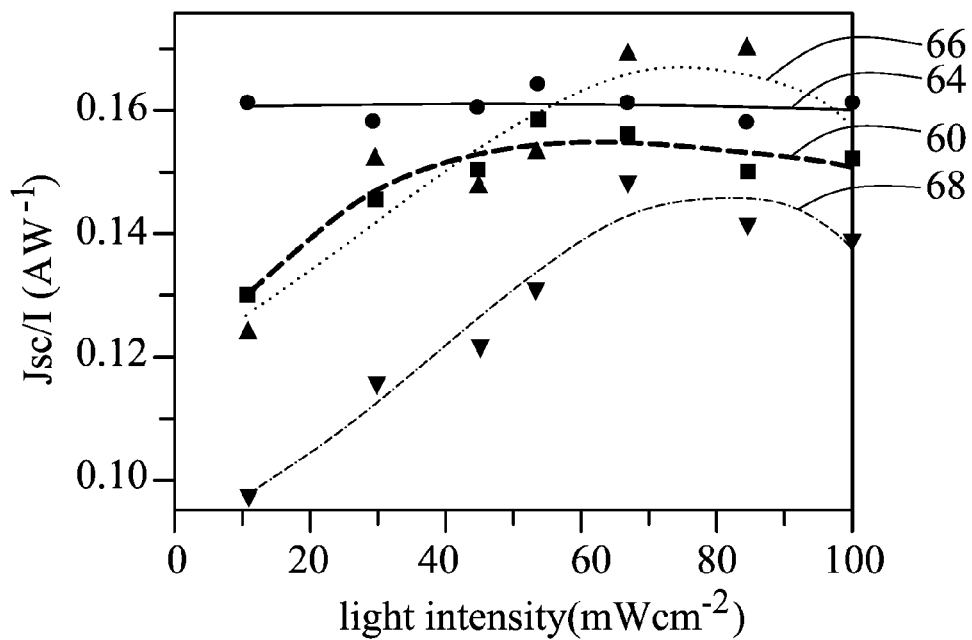
FIG. 6a is a short-circuit current density/light intensity-light intensity curve comparison between the conventional photo electrode formed by undoped $TiO_2$ and various exemplary embodiments of photo electrode formed by a Zn-doped $TiO_2$ porous layer.
Figure 6B:
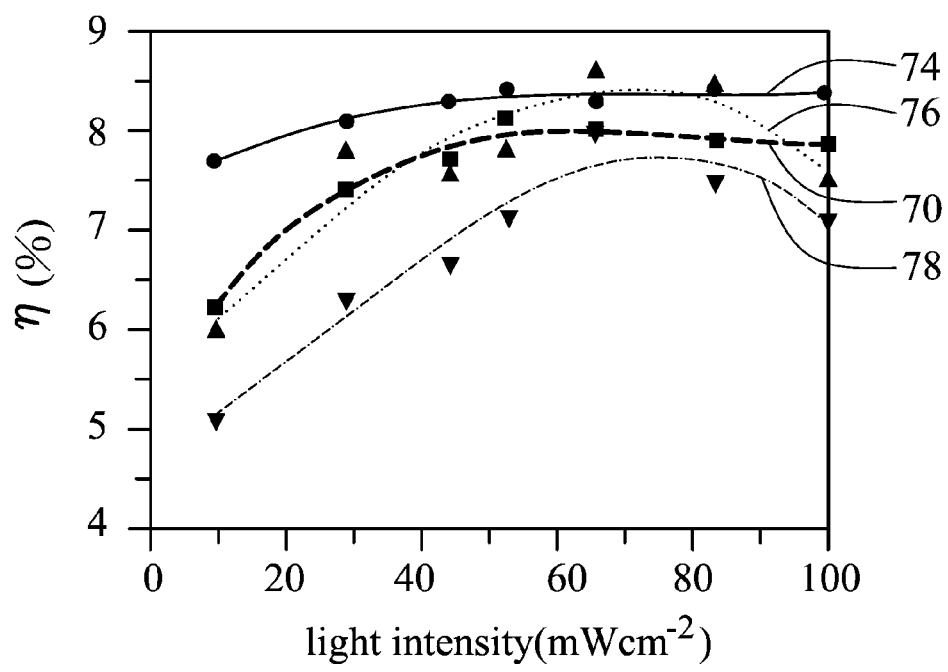
FIG. 6b is a photoelectric conversion efficiency-light intensity curve comparison between the conventional photo electrode formed by undoped $TiO_2$ and various exemplary embodiments of photo electrode formed by a Zn-doped $TiO_2$ porous layer.

FIG. 6a is a short-circuit current density/light intensity-light intensity curve comparison between the conventional photo electrode formed by undoped $TiO_2$ and various exemplary embodiments of a photo electrode formed by a Zn-doped $TiO_2$ porous layer. FIG. 6b is a photoelectric conversion efficiency-light intensity curve comparison between the conventional photo electrode formed by undoped $TiO_2$ and various exemplary embodiments of a photo electrode formed by a Zn-doped $TiO_2$ porous layer. From FIG. 6a, it is shown that the dye-sensitized solar cell with the conventional photo electrode formed by undoped $TiO_2$ (labeled as curve 60) has a much reduced ratio to the short-circuit current density and light intensity (Jsc/I ($A*W^{-1}$)) when light intensity is reduced. The short-circuit current density/light intensity result of the dye-sensitized solar cell with the photo electrode formed by the TZ04 (labeled as curve 64) is not effected when light intensity is changed. The dye-sensitized solar cell with the photo electrode formed by the TZ04 has a high output current especially in low light intensity environments. The dye-sensitized solar cell with the photo electrode formed by the TZ07 (labeled as curve 66) has similar short-circuit current density/light intensity result to the dye-sensitized solar cell with the conventional photo electrode formed by undoped $TiO_2$ (labeled as curve 60). Further, the dye-sensitized solar cell with the photo electrode formed by the TZ07 (labeled as curve 66) has a better short-circuit current density/light intensity result than the conventional photo electrode formed by undoped $TiO_2$ (labeled as curve 60) in 60 to 80 mW*$cm^{-2}$ light intensity environments. If the doping content of the Zn-doped $TiO_2$ is too much, for example, such as the photo electrode formed by the TZ12 photo-anode (labeled as curve 68), the dye-sensitized solar cell with the Zn-doped $TiO_2$ photo-anode has a poorer short-circuit current density/light intensity result than that of the conventional photo electrode formed by undoped $TiO_2$ (labeled as curve 60). Additionally, as shown in FIG. 6b, the dye-sensitized solar cell with the photo electrode formed by the TZ04 photo-anode (labeled as curve 74) has a photoelectric conversion efficiency that is 23% higher than the conventional photo electrode formed by undoped $TiO_2$ (labeled as curve 70). The dye-sensitized solar cell with the photo electrode formed by the TZ07 (labeled as curve 76) has similar photoelectric conversion efficiency results as the dye-sensitized solar cell with the conventional photo electrode formed by undoped $TiO_2$ (labeled as curve 70). Further, the dye-sensitized solar cell with the photo electrode formed by the TZ07 (labeled as curve 76) has a better photoelectric conversion efficiency result than the conventional photo electrode formed by undoped $TiO_2$ (labeled as curve 70) in 60 to 80 mW*$cm^{-2}$ light intensity environments. If the doping content of the Zn-doped $TiO_2$ porous layer is too much, for example, such as the photo electrode formed by the TZ12 (labeled as curve 78), crystal lattice defects occurs, thereby hindering electron transport in the photo-anode and reducing photoelectric conversion efficiency. Note that the photo electrode formed by the TZ12 is an example used for comparison.

One exemplary embodiment provides a dye-sensitized solar cell and a method for fabricating the same, wherein a photo electrode of the dye-sensitized solar cell is formed by a Zn-doped $TiO_2$ porous layer represented by $Ti_{(1-x)}Zn_xO_2$, wherein $0<x\leq0.007$. One exemplary embodiment of a photo electrode formed by a Zn-doped $TiO_2$ porous layer has high Fermi energy $E_{Fn}$, thereby causing a more curved energy band CB curve. The number of unoccupied state traps of the photo electrode formed by the Zn-doped $TiO_2$ porous layer is reduced when compared to conventional photo electrode formed by undoped $TiO_2$. Therefore, one exemplary embodiment of the photo electrode formed by the Zn-doped $TiO_2$ porous layer can provide a more continuous electron transport path. Therefore, electron transportation may be increased, so that the dye-sensitized solar cell still has high photoelectric conversion efficiency and a high output current; especially in low light intensity environments.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for fabricating a dye-sensitized solar cell, comprising:
   (a) mixing a $TiO_2$ powder, a Zn-containing compound and an alkaline aqueous solution to form a mixture and performing a thermal process on the mixture to form a Zn-doped $TiO_2$ powder;
   (b) mixing a binder solution with the Zn-doped $TiO_2$ powder to form a paste;
   (c) coating the paste on a first electrode, and the paste is performed a sintering process to form a Zn-doped $TiO_2$ porous layer, wherein the Zn-doped $TiO_2$ porous layer and the first electrode construct a photo electrode;
   (d) disposing a second electrode opposite to the photo electrode after a dye is absorbed by the Zn-doped $TiO_2$ porous layer; and
   (e) disposing an electrolyte between the photo electrode and the second electrode.

2. The method for fabricating a dye-sensitized solar cell as claimed in claim 1, wherein the thermal process further comprising:
   (a) performing a first thermal process on the mixture;
   (b) performing a washing process on the mixture using an acidic aqueous solution; and
   (c) performing a second thermal process on the mixture.

3. The method for fabricating a dye-sensitized solar cell as claimed in claim 1, wherein the Zn-containing compound comprises Zn-containing inorganic metal salts or organic Zn-containing compounds.

4. The method for fabricating a dye-sensitized solar cell as claimed in claim 2, wherein the first thermal process and the second thermal process comprise a hydrothermal synthesis process.

5. The method for fabricating a dye-sensitized solar cell as claimed in claim 2, wherein the first thermal process has a process time of between about 20 to 40 hours.

6. The method for fabricating a dye-sensitized solar cell as claimed in claim 2, wherein the first thermal process has a process temperature of between about 110° C. and 140° C.

7. The method for fabricating a dye-sensitized solar cell as claimed in claim 2, wherein the second thermal process has a process time of between about 10 and 20 hours.

8. The method for fabricating a dye-sensitized solar cell as claimed in claim 2, wherein the second thermal process has a process temperature of between about 180° C. and 250° C.

9. The method for fabricating a dye-sensitized solar cell as claimed in claim 1, wherein the alkaline aqueous solution is a sodium hydroxide aqueous solution.

10. The method for fabricating a dye-sensitized solar cell as claimed in claim 2, wherein the acidic aqueous solution is a nitric acid or hydrogen chloride aqueous solution.

11. The method for fabricating a dye-sensitized solar cell as claimed in claim 2, wherein the mixture after performing the washing process reaches a pH value of between about 1.5 and 4.

12. The method for fabricating a dye-sensitized solar cell as claimed in claim 1, wherein the Zn-doped TiO2 porous layer is represented by $Ti_{(1-x)}Zn_xO_2$, wherein $0<x\leq0.007$.

13. The method for fabricating a dye-sensitized solar cell as claimed in claim 1, wherein a solvent of the binder solution comprises $H_2O$, an alcohol of $C_{1-4}$, terpineol or carbitol, and a binder of the binder solution comprises sodium carboxymethyl cellulose, carboxymethyl cellulose (CMC), polyethylene glycol (PEG), ethyl cellulose (EC) or arcylic resin.

* * * * *